3,270,064
METHOD FOR PREPARATION OF I-INOSITOL
Yanosuke Inaba, Fujisawa, Kanagawa Prefecture, Goro Kimura, Kamakura, Kanagawa Prefecture, and Shiro Otani, Omuta, Fukuoka Prefecture, Japan, assignors to Toyo Koatsu Industries, Inc., Tokyo, Japan, a corporation of Japan
No Drawing. Filed Jan. 19, 1962, Ser. No. 167,428
Claims priority, application Japan, Jan. 26, 1961,
36/1,997
6 Claims. (Cl. 260—631)

This invention relates to an improved method for the preparation of i-inositol which process is characterized materials of grains such as rice, wheat, oats, etc., brans such as rice-brans, wheat-brans, oat-brans, etc., that are made by polishing grains, and embryo buds, seeds of plants and the defatted residues thereof.

This invention particularly relates to a process for the preparation of i-inositol which process is characterized by the steps of: (1) extracting a raw material as mentioned above with a dilute aqueous solution of either an inorganic acid or an organic acid or a mixed aqueous solution thereof to obtain an acidic liquid extract; (2) precipitating the inositol phosphate salts which are contained in the extract by bringing the pH of said extract to alkalinity by the addition of at least one alkaline substance, such as sodium hydroxide, potassium hydroxide, ammonia, and the like; (3) filtering the resulting precipitate; (4) washing or not washing the precipitate; (5) hydrolyzing the inositol phosphate salts contained by said precipitate under heat and pressure, directly or after addition of a carbonate of an alkaline earth metal (6) filtering or not filtering the hydrolyzate; (7) reacting the phosphoric acid and water-soluble phosphates contained by the filtrate or the hydrolyzate with the carbonate of an alkaline earth metal which is already present, or which is newly added, to form insoluble inorganic phosphates; (8) filtering out the insoluble inorganic phosphates; (9) decolorizing the filtrate and further removing any remaining inorganic phosphates with an ion exchange resin to obtain pure i-inositol.

The present invention applies not only to the hexaphosphate ester of i-inositol (i.e., phytin, which is generally defined as the acid salts of phytic acid wherein some of its twelve acid hydrogen atoms are replaced by other cations, particularly magnesium, calcium and potassium, originally existing in grains, brans, embryo buds and seeds of plants) but also applies to the corresponding metal salts of mono- and polyphosphate esters of i-inositol in which 1 molecule of i-inositol is combined with 1–5 molecules of phosphoric acid which represent a partially decomposed state of phytin brought about by phytase during storage of the raw material or in the course of the acid extraction operation. Thus, by the term "inositol phosphate salts," as used herein, is meant the magnesium, calcium and/or potassium salts of all the phosphate esters of i-inositol, i.e., those esters having the formula, $C_6H_6O_6[-PO(OH)_2]_n[-H]_{6-n}$, wherein $n$ is an integer of 1 to 6.

The metal atoms of the inositol phosphate salts that naturally exist in rice-bran are the alkaline earth metal atoms and alkali metal atoms. These alkaline earth metal atoms include magnesium and calcium, in a total amount of 10–14 percent based on the weight of said inositol phosphate salt. The alkali metal atoms include potassium in an amount of 4–5 percent based on the weight of said inositol phosphate salt.

We have found that the dissolution of the protein and carbohydrate contents of the raw material into the acidic extract, obtained in the above-mentioned extraction step, can be prevented by employing suitable concentrations of the acidic aqueous extracting solution and other conditions so that only the alkali metal atoms of the inositol phosphate salts dissociate. In this regard the following conditions are preferred: the concentration of the dilute acidic aqueous extracting solution should be 0.2–10 weight percent, the extraction temperature should be 5–70° C., and the extraction time should be 1–100 min. Carbohydrates, proteins, fats and oils can be further deterred from dissolving into the extract by the addition of urea, ammonium salts, such as ammonium sulfate, ammonium carbonate or ammonium phosphate, or neutral salts, such as sodium sulfate or sodium chloride to the extraction liquor. The preferred amount of such added compound is 0.05–5 percent based on the weight of extraction liquor and the pH of said liquor is preferably maintained at 0.5–3.5 to further prevent the dissolution of the carbohydrates, proteins, etc. Thus, the dissolution of proteins, carbohydrates, etc. into the extract can be kept to less than 0.1 percent by weight.

Subsequently the extract is treated with an alkaline substance. The inositol phosphate salts in the extract do not precipitate at all when the pH of the extract is 5–6, according to our researches. At a pH of 6–7, only 30–60 percent of the entire content of the inositol phosphate salts, originally in the raw material, precipitates. Also, the precipitate contains 3–16% of protein and 1–8% of carbohydrate on a dry basis, mainly because the isoelectric point of protein lies in this range of pH. It is important, therefore, to raise the pH up to more than 7 by the addition of an alkaline substance, and thus allow the protein and carbohydrate content to stay in solution. In this instance the hydroxide of an alkaline earth metal is not employed as the alkaline substance. The alkaline substances to be employed should have a high solubility in water and the following are suitable: hydroxides of alkali metals, such as sodium hydroxide, potassium hydroxide, etc., or ammonia and the pH level of the extract should be controlled at 7 or more, preferably 7–11 and most preferably 8–9.5. In such a case, 3.–8 percent, respectively, of sodium in the case of employing sodium hydroxide, of potassium in the case of employing potassium hydroxide, or of ammonia in the case of employing aqueous ammonia as said alkaline substance, is found in a combined state in the inositol phosphate salts.

In the hydrolysis step which follows, a small amount of a carbonate of an alkaline earth metal is added to the water-containing, paste-like inositol phosphate salts obtained by the above-mentioned precipitation operation and said salts are hydrolyzed by autoclaving, thereby forming a clear liquor and water-insoluble inorganic phosphates (mainly a mixture of the phosphates of magnesium and calcium, which may be used as fertilizers, etc.). After filtering these insoluble inorganic phosphates they are washed with hot water and the resulting wash water is combined with the filtrate. The pH of the combined liquor formed by combining the filtrate and wash water is usually about 5–7. This liquor contains not only i-inositol but also free phosphoric acid and water-soluble inorganic phosphates. If the hydrolysis is carried out without adding an alkaline earth metal carbonate, the pH of said combined liquor usually shows about 3–4.5. The combined liquor in this case has a higher content of free phosphoric acid and water-soluble inorganic phosphate than in the former case. Therefore, the subsequent desalting step as will be hereinafter described is rendered more difficult and it is preferable to add an alkaline earth metal carbonate prior to hydrolysis. The presence of alkaline earth metal carbonate increases the hydrolysis velocity since the water-soluble inorganic phosphate liberated by the hydrolysis is changed into insoluble phosphate. As the pH of the hydrolysis liquor is nearly neutral the present invention has many advantages such as prevention of corrosion of hydrolysis apparatus. As a result of many attempts to remove impurities further from the hydrolysis filtrate it was found possible to do so by adding an additional amount of calcium carbonate or magnesium carbonate to this filtrate to bring the pH of the mixture to 7–9 while stirring it under heating, whereby the above-mentioned free phosphoric acid and water-soluble inorganic phosphate are converted into insoluble calcium or magnesium phosphates. The amount of alkaline earth metal carbonate added prior to hydrolysis is not narrowly critical and need only be sufficient to accomplish the above-mentioned results. In general, an amount of 5 percent based on the weight of inositol phosphate salts in the paste-like filter cake provides the above-mentioned advantageous results and any practical amount above this can be employed.

Heretofore, free phosphoric acid and water-soluble phosphates were removed as insoluble calcium phosphate by reaction with calcium oxide or calcium hydroxide added to the filtrate. We have found this to be disadvantageous because some amount of the i-inositol in the filtrate produces insoluble i-inositol-lime complexes, such as $C_6H_{12}O_6 \cdot CaO$, and the method results in a lower yield of i-inositol. The formation of this complex has been very difficult to prevent and the use of calcium oxide or hydroxide is utterly disadvantageous in industrial operations. In particular, there are many conditions that must be controlled, such as the number of times of addition of calcium oxide or calcium hydroxide, the addition velocity, agitation conditions, temperatures, reaction times, pH's, etc. and it is necessary that each of them be adjusted to optimum. In general, since the concentration of the soluble inorganic phosphate in the filtrate after hydrolysis under pressure is dilute and the reaction velocity after addition of calcium hydroxide is slow, the determination of end point is difficult. Especially when a small amount of alkaline earth metal carbonate is added to the inositol phosphate salt, hydrolysis carried out and the hydrolyzate filtered, the concentration of the soluble inorganic phosphate in the filtrate becomes very dilute. Accordingly, after the addition of slaked lime to the filtrate, the above-mentioned complexing tendency in the desalting reaction (double decomposition for removing soluble inorganic phosphate as insoluble inorganic phosphate as mentioned above) becomes more pronounced.

Even if the addition of the slaked lime to the hydrolysis filtrate and the desalting reaction are carefully carried out, a considerable amount of i-inositol complexes with the lime, as aforementioned, and causes loss of inositol in the calcium phosphate precipitate. In Table 1 the loss percentage of i-inositol into the filter cake is shown.

TABLE 1

| pH after addition of slaked lime | Loss weight percentage of i-inositol based on the i-inositol content of the hydrolysis filtrate |
|---|---|
| 8.0 | 8.1 |
| 9.0 | 11.1 |
| 9.5 | 12.4 |
| 10.5 | 15.2 |
| 11.5 | 17.5 |
| 12.2 | 89.2 |
| 12.5 | 98.9 |

Furthermore, the following experiment was made. Different amounts of slaked lime were added each to 200 cc. of 9 weight percentage pure i-inositol aqueous solution, and each mixture was boiled for 1 hour, left standing at room temperature for 2 hours and filtered. The precipitate was filtered and washed thoroughly with water. The total amount of the filtrate and washings was adjusted to 300 cc. In Table 2 is shown the loss percentage of i-inositol, which is lost in the precipitate, calculated by measuring the i-inositol content in this filtrate.

TABLE 2

| Initial amount of i-inositol, g. | Added amount of slaked lime, g. | Amount of i-inositol in filtrate, g. | Loss weight into the precipitate |
|---|---|---|---|
| 18 | 1.5 | 9.5 | 47.2 |
| 18 | 3.0 | 6.8 | 62.1 |
| 18 | 3.5 | 5.4 | 70.0 |
| 18 | 5.0 | 2.0 | 88.9 |
| 18 | 7.5 | 1.7 | 90.5 |

Formation of lime–i-inositol complex is very difficult to prevent, even if the above-mentioned operation is very carefully performed and a loss always occurs into the precipitate.

As a result of an investigation of various salts which are more effective in desalting, that is to say, changing impurities such as phosphoric acid and soluble phosphate to insoluble phosphate by double decomposition without producing complexes with the i-inositol in the filtrate, we have discovered that it is most suitable to add alkaline earth metal carbonate in powdered form such as calcium carbonate and magnesium carbonate and heat the mixture to cause the precipitate of calcium or magnesium phosphates, while maintaining the pH of the filtrate at 7–9.

As a result of measuring the i-inositol content in the filtrate obtained by either adding various amount of carbonates such as calcium carbonate, magnesium carbonate, basic magnesium carbonate, etc., stirring at normal temperature or boiling for 1–3 hours and filtering after cooling to room temperature or in the hot state, it was discovered that i-inositol and the alkaline earth metal carbonate do not form any complex at all.

In an embodiment of our process heat economy can be realized by injecting the high temperature hydrolyzate from the autoclave into a vessel under normal pressure or vacuum, thereby concentrating it by spontaneous evaporation due to its potential heat. Thereafter, the alkaline earth metal carbonate is introduced into the vessel to neutralize the hydrolyzate liquor, and the above-mentioned desalting reaction takes place. In addition, as i-inositol and the alkaline earth metal carbonate do not produce any complex at all, the addition of an excessive amount of the carbonate causes no difficulty.

Whereas, according to the prior arts, when slaked lime is added in the desalting step, lime and i-inositol readily form a complex, therefore, it is necessary to neutralize the hydrolyzate liquor slowly by gradually adding slaked lime with caution.

According to the process of the present invention, the desalting is easier, treatment time is shorter and the amount of alkaline earth metal carbonate added is smaller, in the case of two additions of the alkaline earth metal carbonate, i.e., the first addition prior to the hydrolysis under pressure and the second addition after the hydrolysis as mentioned above, than the case of operation of only one addition either prior to hydrolysis under pressure or after the hydrolysis. But since i-inositol and the alkaline earth metal carbonate do not complex, the desalting effect can also be achieved to the same degree brought about by the two addition procedure by only one addition using a somewhat larger amount of the carbonate. The total amount of alkaline earth metal carbonate added prior to or after hydrolysis or both prior to and after hydrolysis is not narrowly critical and should be sufficient to react with all of the free phosphoric acid or water-soluble inorganic phosphate to convert same to water-insoluble phosphates. Generally, said total amount is at least 12 percent based on the weight of inositol phosphate salts in the cake being hydrolyzed.

By the treatment with the alkaline earth metal carbonate, the hydrolyzate liquor is decolored to a certain degree since the colored substances are adsorbed in the precipitate. But the filtered liquor thereafter is preferably further decolored by treating it with activated carbon or passing it through an ion exchange resin. Then any remaining water-soluble inorganic acid and inorganic salt are removed by passing the filtrate through an ion exchange resin tube or ion exchange resin membranes. Subsequently, the filtrate is concentrated and dried to obtain substantially pure i-inositol at a high yield. The treatment with activated carbon can be applied simultaneously with the treatment with the alkaline earth metal carbonate in the same apparatus.

According to the present invention it is possible to obtain substantially pure i-inositol at a yield higher than 95% by weight based on the theoretical yield from the inositol phosphate salts extracted from the raw material and at a yield higher than 90% by weight based on its content in the raw material.

One of the features of our invention is to directly hydrolyze the inositol phosphate salts obtained as the precipitate produced by alkalizing the above-mentioned extract.

According to prior art the following operation was tried; the said pasty phosphate was dried and powdered, water was added thereto, and the resulting mixture was then hydrolyzed under pressure. The subsequent steps, namely the process for separating i-inositol, in accordance with this invention was followed and the yield of i-inositol was found to be only 30–40 percent based on its original content. The reason for this low yield is that the particles of the inositol phosphate salts are so minute that they form the so-called "colloidal precipitates" which solidify, when they are dried, to a gypsum-like state. Even if they are pulverized by a pulverizer the bonds between the particles are so strong that they are still in a massive state microscopically. The degree of hydrolysis therefore is lower, since water does not permeate into the interior of this massive state even if brought into contact with water at high temperatures and pressures for long periods of time.

The prior art as set forth in U.S.P. 2,615,053, 2,456,470 and other literature were traced. As stated before, the water-containing paste-like inositol phosphate salts which were obtained by filtration after the alkalization of the acid extract, were directly hydrolyzed without addition of any alkaline substance, filtered and filtrate (having a pH of 3–5) was treated in accordance with either of the following procedures (1) or (2):

(1) To the filtrate a suitable amount of slaked lime was added while being heated and stirred, the pH being maintained at 9–11.

(2) To the filtrate slaked lime was added to a pH of 5–7 while being heated and stirred, then filtered, and additional slaked lime was again added to the filtrate until the pH attained 9–11.

The calcium phosphate produced by means of (1) or (2) above was filtered, the filtrate was concentrated and the inorganic salt produced was again filtered and this filtrate was treated in accordance with either of the following procedures (A) or (B) to obtain refined i-inositol:

(A) I-inositol contained in the filtrate was recrystallized in an alcohol medium, which usually comprises a primary alcohol such as methyl alcohol, ethyl alcohol and so on, or a mixture of said alcohol and acetic acid or phosphoric acid.

(B) the filtrate was decolorized with activated carbon and then passed through an ion exchange resin and concentrated to obtain refined i-inositol.

The yields of i-inositol obtained by means of the above methods (A) and (B) were only 60–75 percent based on theoretical value. That is, besides the loss accompanied by the recrystallization operation, water-soluble inorganic phosphate (mainly dihydrogen phosphate and hydrogen phosphate) and slaked lime respectively combined with i-inositol to produce complexes in the course of concentration under heating, resulting in a loss of i-inositol. According to our researches, i-inositol shows the characteristics of a sensitive amphoteric substance. Especially in the above-mentioned desalting operation when quick lime or milk of slaked lime is employed, it is quite difficult to prevent the formation of i-inositol–lime complex however carefully adjustments are made to the conditions to be controlled, such as the number of additions of slaked lime, addition velocity, agitation state, heating temperature, heating time and pH, etc. Therefore, the yield of i-inositol falls.

According to the process of the present invention, however, the yield of i-inositol improves because in the case of treatment with the alkaline earth metal carbonates, i-inositol and these carbonates do not produce any complex at all. According to the process of our invention, as aforementioned, when the content of the inositol phosphate salt is precipitated by alkalizing the acidic extracted liquor with an alkaline substance such as alkali metal hydroxide and ammonia, a portion of cationic atoms of the inositol phosphate salts in plant origin as raw material is replaced by the cation of alkali metal or ammonium. Said cationic atoms are transferred into the liquor and the resulting content of sodium or ammonium combined in the inositol phosphate salt was 3–8 percent by weight of the phosphate.

Much literature and many patents concerning the manufacture of phytin have been published, but according to these prior art processes only about less than half of the original content of the phosphates combined with i-inositol is recovered. That is, a yield of only about 5–7 percent by weight based on a rice-bran raw material is obtained. It is noteworthy, however, that according to the process of the present invention the yield of the inositol phosphate salt improves to 10–18 percent based on a rice-bran raw material.

Furthermore, by employing the process of this invention, it is possible to recover all of the metal salts of phosphoric acid esters in which 1 molecule of i-inositol is combined with 1–5 molecules of phosphoric acid. Moreover, this invention has an additional advantage in that the inositol phosphate salt recovered contains less than 1% of protein and carbohydrate, etc., based on the total weight of the recovered product. Thus, since said inositol phosphate salts having 1 to 5 phosphate groups are in a partially hydrolyzed state, the present invention is advantageous in that hydrolysis of said i-inositol mono-, di-, tri-, tetra-, and pentaphosphates is easily carried out at a lower temperature, lower pressure and in a shorter time than in the case where the inositol hexaphosphate salt or the so-called "phytin" is employed. Moreover, the present invention is advantageous in that hydrolysis is easily effected at a lower temperature, lower pressure and in a shorter time than hydrolyzing the moistened powder form of the inositol phosphate salt, because said salt according to this invention is hydrolyzed in a paste-like state with the result that much moisture remains between the molecules of said salt. The temperature of hydrolysis under pressure according to this invention is preferably 100–300° C. As the above-mentioned resin for decolorizing purpose, a resin of an aromatic amine having a broad lattice shape with a very large porous volume, for example, either trade names Asmit resin 173 (manufactured by Induftrieele Maatschappij Activit N.V., Amsterdam, Netherlands), or Centranol W–291 (manufactured by N.V. Chemurgische Producten, Amsterdam, Netherlands), is suitable.

The process will be further illustrated in conjunction with the following specific examples. It should be understood, however, that the examples are given for the purpose of illustration and not by way of limitation.

*Example 1*

Two hundred liters of an aqueous solution of 1% hydrochloric acid were added to 20 kg. of defatted ricebran. This mixture was heated at 40° C. for 30 minutes, and after a rapid filtration of the extracted liquor the filter cake was washed with an aqueous solution of 0.2% hydrochloric acid. The washings and the filtrate were combined. Ammonia gas was passed into the combined liquor while the latter was being sufficiently agitated, and the pH was maintained at 9.0. The inositol phosphate salt content of the combined liquor precipitated and the precipitate was filtered. The resulting filter cake was put into a dilute aqueous ammonia having a pH of 8.5, thoroughly and vigorously agitated and again filtered.

About 2.7% of calcium carbonate based on the weight of the resulting pasty filter cake was added to said filter cake. (This pasty cake retained an amount of water of about 7 times the weight of the dry product. Analysis of the dry product showed that it contained 8.20% carbon, 2.50% hydrogen, 21.1% phosphorus, 11.2% magnesium, 0.2% calcium and 3.7% ammonia by weight, and it was observed that some amount of $NH_4$ added as a precipitant was combined with the product.) The resulting mixture was thoroughly mixed, placed in an agitation type autoclave made of stainless steel containing about 18% of Cr and 8% of Ni, and heated to a reaction temperature of about 220° C. for 3 hours under stirring. The resulting hydrolyzate mixture was then injected into a vacuum vessel which was at a reduced pressure of −700 mm. Hg. It was concentrated by spontaneous evaporation due to its potential heat content. Calcium carbonate and activated carbon were introduced into this vacuum vessel and the resulting mixture was heated for about 2 hours. After the evolution of ammonia and carbon dioxide gas had stopped, the mixture was filtered and the filter cake was washed with hot water. The washings and the filtrate were combined. After passing this combined filtrate through ion exchange resin columns (the first column comprises Amberlite IR–120, the second column IR–45 and the third column a monobed consisting of IR–120 and IRA–410 manufactured by Rohm & Haas Company) it was concentrated under vacuum, filtered and dried to obtain 405 g. of i-inositol.

*Example 2*

Fifteen liters of an aqueous solution of 2% sulfuric acid and 10 g. of ammonium sulfate were added to 1 kg. of ricebran, and the mixture was agitated for 1 hour at room temperature. After separating the extract from the residue by centrifugal separation, an aqueous solution of 10% sodium hydroxide was added to the extract with agitation, and the pH was maintained at 9.5. The resulting mixture was further agitated for 1 hour, whereby the inositol phosphate salt was precipitated, filtered and washed thoroughly with water. 20 g. of powdered magnesium carbonate was added directly to the resulting paste-like filter cake. (This cake contained an amount of water of about 7.5 times the weight of the dry product. Analysis showed that the dry product contained C 7.70%, H 24.5%, P 19.6%, Ca 0.9%, Mg 10.8% and Na 4.8%. It was distinctly observed that a minor amount of Na from the sodium hydroxide added as a precipitant was combined with the product.) The mixture was placed in a shaking type autoclave lined with 18–8 stainless steel, heated to 210° C. for 3 hours and cooled. When the temperature of the mixture decreased to 90–95° C. it was taken out of the autoclave and filtered. The principal component of the resulting cake was magnesium phosphate. The cake was thoroughly washed with hot water, and the washings and the filtrate were combined. Powdered calcium carbonate was added to this combined liquor to adjust the pH to 8.4 and the resulting mixture was heated. Since the occurrence of foam became violent as double decomposition proceeded a few drops of a defoaming agent, such as silicone oil, were added dropwise under heating and agitation.

After allowing sufficient double decomposition or desalting to take place, the reaction mixture was filtered. The principal components of the precipitate obtained were calcium phosphate and calcium carbonate. The cake was washed with hot water, and the washings and the filtrate were combined. The resulting combined liquor was decolorized by passing it through a resin column (comprising Asmit resin 173) for decolorization purpose, again passed through ion exchange resin columns (the first column comprised Amberlite IR–120, the second column XE–168, and the third column a monobed consisting of IR–120 and IRA–411 manufactured by Rohm & Haas Company) concentarted, filtered and dried to obtain 19.2 g. of i-inositol.

*Example 3*

Fourteen liters of an 0.8% aqueous sulfurous acid were added to 1 kg. of wheat-bran. After carrying out an extraction at 20° C. by stirring this mixture for 20 minutes, the mixture was filtered. The resulting filter cake was washed with 0.3% aqueous sulfurous acid. The washings and the filtrate were combined, and 8% aqueous caustic soda was added with sufficient stirring, the pH being adjusted to 7.0. Finally, after raising the pH to 8.8 with 5% aqueous ammonia, the inositol phosphate salts were precipitated and filtered. After thoroughly washing the resulting cake with water it was placed, in a paste-like state (containing 8 times as much water as the weight of dry solids) into an agitation type autoclave of hard steel, and after carrying out hydrolysis at 240° C. for 2 hours the reaction product was withdrawn therefrom into a cooler with the aid of the internal autoclave pressure and filtered. The resulting filter cake was washed with hot water. The principal component of the filter cake was magnesium phosphate. The combined liquor of the filtrate and washings was heated and powdered calcium carbonate and activated carbon were added under agitation. Ammonia and carbon dioxide gas began to evolve at about 95–100° C., and the heating and agitation were continued until evolution of these gases stopped. The pH at this point was 8.3. The combined liquor was filtered and the filter cake washed with hot water. The washings were combined with the filtrate. After passing the combined liquor through an ion exchange membrane apparatus having a cation resin of the sulfonic acid type and an anion exchange resin of the tertiary amine type, the liquor was concentrated, filtered and dried to obtain 8.9 g. of i-inositol.

*Example 4*

Eight liters of 0.5% aqueous sulfuric acid and 6 liters of 1% aqueous acetic acid were added to 1 kg. of defatted rape-seed residue. Extraction was effected by maintaining the mixture at 45° C. for 1.5 hours. The mixture was filtered and the cake was thoroughly washed with 0.2% acetic acid. Eight percent aqueous caustic soda was added to the combined liquor of the filtrate and washings. The inositol phosphate salts were precipitated, the pH being maintained at 10.4. After filtering out this precipitate, it was again dissolved in 1.5% aqueous sulfuric acid. While the resulting solution was kept at 45° C., 10% aqueous caustic soda was added to it, the pH being maintained at 9.8. After the second precipitation, a second filtration was carried out.

Powdered barium carbonate in an amount of about 1.3% by weight based on the pasty cake obtained by the second filtration was thoroughly mixed with this cake. (The cake contained about 6.5 times as much water as the weight of dry solids.) The resulting mixture was hydrolyzed under pressure at 195° C. for 7 hours in an autoclave made of hard steel. Subsequently the reaction product was withdrawn therefrom and filtered. The cake was washed with hot water and was found to contain mainly magnesium phosphate and barium phosphate. The combined liquor of the filtrate and washings was heated and powdered calcium carbonate was added under agitation, the pH being adjusted to 8.5.

After about 2 hours' heating the precipitate was filtered and washed with hot water. The washings were combined with the filtrate. After passing the combined liquor through a resin column for decolorization purposes (comprising Centranol W–291, manufactured by N. V. Chemurgische Producten, Amsterdam, Netherlands), it was again desalted and refined by passing it through an ion exchange resin column (comprising a monobed containing Amberlite IR–120 and IRA–401 manufactured by Rohm & Haas Company). Thereafter, the liquor was concentrated and dried to obtain 10.4 g. of i-inositol.

*Example 5*

Seven liters of an aqueous solution of 1.3% sulfuric acid were added to 1 kg. of embryo bud of rice. The mixture was agitated for 1 hour at room temperature, filtered, and the residue was washed with an aqueous solution of 0.2% sulfuric acid. To the combined liquor of the filtrate and washings was added under thorough stirring 5% aqueous sodium hydroxide, the pH being maintained at 8.3. The inositol phosphate salt was precipitated and filtered. After thoroughly washing the resulting cake with water, calcium carbonate, in an amount of about 7% based on the weight of the pasty cake, was added to said cake which contained about 8 times as much water as the weight of dry solids. After thorough agitation of the mixture, it was placed in an autoclave of the agitation type made of 18–8 stainless steel wherein it was maintained at a reaction temperature of 235° C. for 2 hours with stirring. The resulting high temperature hydrolyzate was injected into an evaporator wherein it was concentrated by spontaneous evaporation due to its potential heat. It was filtered after concentration by further heating. After the resulting filter cake was washed thoroughly with hot water, the combined liquor of the filtrate and washings was passed through a resin tube made for decolorization purpose (comprising Asmit resin 173). Subsequently it was passed through ion exchange resin columns (the first column contained Amberlite IR–120, the second column XE–168 and the third column a monobed contained IR–120 and IRA–401, manufactured by Rohm & Haas Company), concentrated, filtered and dried to obtain 20.3 g. of i-inositol.

What is claimed is:
1. A process for manufacturing i-inositol from grains containing i-inositol phosphate salts, comprising: extracting said grains with 0.2 to 10 weight percent of an inorganic acidic aqueous solution, at a temperature of 5–70° C. for a period of time of 1–100 minutes to provide an acidic extract, separating said extract and precipitating i-inositol phosphate salts contained thereby by raising the pH to at least 7 with the addition of an alkaline substance, separating said precipitate and subjecting it to a temperature of from 100 to 300° C. and pressure in the presence of an alkaline earth metal carbonate for at least one hour to hydrolyze the i-inositol phosphate salts contained thereby and form a hydrolyzate liquor having a pH between 7 and 9, thereafter desalting said hydrolyzate liquor to form insoluble inorganic phosphates, separating said insoluble inorganic phosphates and concentrating the resulting liquor to obtain i-inositol.

2. The process as claimed in claim 1, wherein said alkaline earth metal carbonate is calcium carbonate.

3. The process as claimed in claim 1, wherein said alkaline earth metal carbonate is magnesium carbonate.

4. The process as claimed in claim 1, wherein said alkaline earth metal carbonate is barium carbonate.

5. The process as claimed in claim 1 wherein the alkaline substance is alkali metal hydroxides.

6. A process for manufacturing i-inositol from grains containing i-inositol phosphate salts, comprising extracting said grains with 0.2 to 10 weight percent of an inorganic acidic aqueous solution containing from 0.05–5 percent of a compound selected from the group consisting of urea, ammonium salts and sodium salts at a temperature of from 5–70° C. for a period of time of from 1–100 minutes to provide an acidic extract, separating said extract and precipitating i-inositol phosphate salts contained therein by raising the pH to at least 7 by the addition of an alkaline substance, separating said precipitate and subjecting it to a temperature of from 100 to 300° C. and pressure in the presence of an alkaline earth metal carbonate for at least one hour to hydrolyze the i-inositol phosphate salts contained thereby and form a hydrolyzate liquor having a pH between 7 and 8, thereafter desalting said hydrolyzate liquor to form insoluble inorganic phosphates, separating said insoluble inorganic phosphates and concentrating the resulting liquor to obtain i-inositol.

References Cited by the Examiner

UNITED STATES PATENTS

| | | | |
|---|---|---|---|
| 2,112,553 | 3/1938 | Bartow et al. | 260—631 |
| 2,456,470 | 12/1948 | Thomas | 260—631 |

LEON ZITVER, *Primary Examiner.*

CHARLES B. PARKER, *Examiner.*

A. H. SUTTO, D. P. CLARKE, T. G. DILLAHUNTY,
*Assistant Examiners.*